US012803620B2

(12) United States Patent
Wang et al.

(10) Patent No.: US 12,803,620 B2
(45) Date of Patent: Nov. 17, 2026

(54) SIGNAL ADJUSTMENTS IN USER EQUIPMENT-COORDINATION SET JOINT TRANSMISSIONS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 519 days.

(21) Appl. No.: 18/546,026

(22) PCT Filed: Jan. 18, 2022

(86) PCT No.: PCT/US2022/012800
§ 371 (c)(1),
(2) Date: Aug. 10, 2023

(87) PCT Pub. No.: WO2022/173560
PCT Pub. Date: Aug. 18, 2022

(65) Prior Publication Data

US 2024/0137073 A1 Apr. 25, 2024
US 2024/0235618 A9 Jul. 11, 2024

Related U.S. Application Data

(60) Provisional application No. 63/148,487, filed on Feb. 11, 2021.

(51) Int. Cl.
*H04B 7/024* (2017.01)
*H04B 7/06* (2006.01)

(52) U.S. Cl.
CPC ........... *H04B 7/024* (2013.01); *H04B 7/0617* (2013.01)

(58) Field of Classification Search
CPC .... H04B 7/024; H04B 7/0617; H04B 7/0673; H04B 7/026
See application file for complete search history.

(56) References Cited

U.S. PATENT DOCUMENTS 10,165,491 B1 * 12/2018 Sitaram ............. H04W 36/0088
2008/0284641 A1 * 11/2008 Spreadbury .............. H01Q 3/22 342/201

(Continued)

FOREIGN PATENT DOCUMENTS

| | | |
|---|---|---|
| GB | 2491367 | 12/2012 |
| WO | 2020186097 | 9/2020 |
| WO | 2022173560 | 8/2022 |

OTHER PUBLICATIONS

"International Preliminary Report on Patentability", Application No. PCT/US2022/012800, Apr. 21, 2023, 8 pages.

(Continued)

*Primary Examiner* — Fred A Casca
(74) *Attorney, Agent, or Firm* — Colby Nipper PLLC

(57) ABSTRACT

Techniques described herein describe aspects of signal adjustments in user equipment-coordination set, UECS, joint transmissions. A base station analyzes a first joint transmission from multiple user equipments, UEs, participating in a UECS, where the multiple UEs include a coordinating UE of the UECS and at least one non-coordinating UE participating in the UECS. The base station determines that the first joint transmission fails to meet a performance metric and directs the multiple UEs participating in the UECS to add signal adjustments to a second joint transmission.

20 Claims, 6 Drawing Sheets

(56) References Cited

U.S. PATENT DOCUMENTS

| | | | |
|---|---|---|---|
| 2010/0091902 | A1 | 4/2010 | Park et al. |
| 2013/0242769 | A1 | 9/2013 | Hammarwall et al. |
| 2014/0171061 | A1 | 6/2014 | Larmo et al. |
| 2014/0177456 | A1 | 6/2014 | Boudreau et al. |
| 2016/0094282 | A1 | 3/2016 | Kazmi et al. |
| 2016/0254882 | A1 | 9/2016 | Lee et al. |
| 2018/0302866 | A1 | 10/2018 | Zhang et al. |
| 2019/0068345 | A1 | 2/2019 | Chen et al. |
| 2019/0123806 | A1* | 4/2019 | Aryafar .................. H04B 7/155 |
| 2019/0306821 | A1* | 10/2019 | Hu .................... H04W 56/0065 |
| 2019/0312616 | A1 | 10/2019 | Christoffersson et al. |
| 2019/0342828 | A1 | 11/2019 | Shellhammer et al. |
| 2019/0357286 | A1 | 11/2019 | Pang et al. |
| 2020/0336178 | A1* | 10/2020 | Ma ....................... H04B 7/0452 |
| 2021/0029516 | A1 | 1/2021 | Wang et al. |
| 2022/0312501 | A1* | 9/2022 | Lei .................... H04W 74/0841 |
| 2022/0336178 | A1 | 10/2022 | Zhou et al. |

OTHER PUBLICATIONS

"International Search Report and Written Opinion", Application No. PCT/US2022/012800, May 16, 2022, 14 pages.
"Written Opinion", Application No. PCT/US2022/012800, Dec. 2, 2022, 5 pages.
"Foreign Office Action", EP Application No. 22706141.3, Feb. 18, 2026, 7 pages.

* cited by examiner

SIGNAL ADJUSTMENTS IN USER EQUIPMENT-COORDINATION SET JOINT TRANSMISSIONS

RELATED APPLICATION(S)

This application is a national stage entry of International Application No. PCT/US2022/012800, filed Jan. 18, 2022, which claims the benefit of U.S. Provisional Application No. 63/148,487, filed Feb. 11, 2021, the disclosures of which are incorporated herein by reference in their entirety.

BACKGROUND

In a wireless network, a base station provides a user equipment (UE) with connectivity to various services, such as data and/or voice services, over a cell coverage area. The base station typically determines configurations for a wireless connection used by the UE to access the services. For example, the base station determines bandwidth and timing configurations of the wireless connection.

The performance of the wireless connection (e.g., data transfer capacity) between the base station and the UE often varies based on a number of factors, such as signal strength, bandwidth limitations, interfering signals, and so forth. A first UE operating at an edge of a cell coverage area, for example, typically receives a weaker signal from the base station relative to a second UE operating relatively close to the center of the cell coverage area. Conversely, the base station receives a weaker signal from the first UE relative to a signal received from the second UE. Thus, as the UE moves to different regions of the cell coverage area, the performance of the wireless connection sometimes degrades. With recent advancements in wireless communication systems, such as Fifth Generation New Radio (5G NR), new approaches may be available to improve the connection performance.

SUMMARY

This document describes techniques and apparatuses for signal adjustments in user equipment-coordination set joint transmissions (UECSs). In aspects, a base station analyzes a first joint transmission from multiple user equipments (UEs) participating in a UECS, where the multiple UEs include a coordinating UE of the UECS and at least one non-coordinating UE participating in the UECS. The base station determines that the first joint transmission fails to meet a performance metric and directs the multiple UEs participating in the UECS to add signal adjustments to a second joint transmission.

In aspects, a coordinating UE transmits, as part of a first joint transmission from the UECS to a base station, a first uplink signal. The coordinating UE receives, from the base station, a command to add signal adjustments to a second joint transmission to the base station; and directs each UE participating in the UECS to add a respective signal adjustment to a respective uplink signal transmitted by the UE as part of a second joint transmission to the base station.

In aspects, a non-coordinating UE transmits a first uplink signal as part of a first joint transmission to a base station. The non-coordinating UE receives, from a coordinating UE participating in the UECS, a command to add a signal adjustment in a second joint transmission to the base station. In response to receiving the command, the non-coordinating UE transmits a second uplink signal as part of a second joint transmission to the base station by adding the signal adjustment to the second uplink signal.

The details of one or more implementations for signal adjustments in user equipment-coordination set joint transmissions are set forth in the accompanying drawings and the following description. Other features and advantages will be apparent from the description, the drawings, and the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects for signal adjustments in user equipment-coordination set joint transmissions are described with reference to the following drawings. The same numbers are used throughout the drawings to reference like features and components.

DETAILED DESCRIPTION

Figure 1:
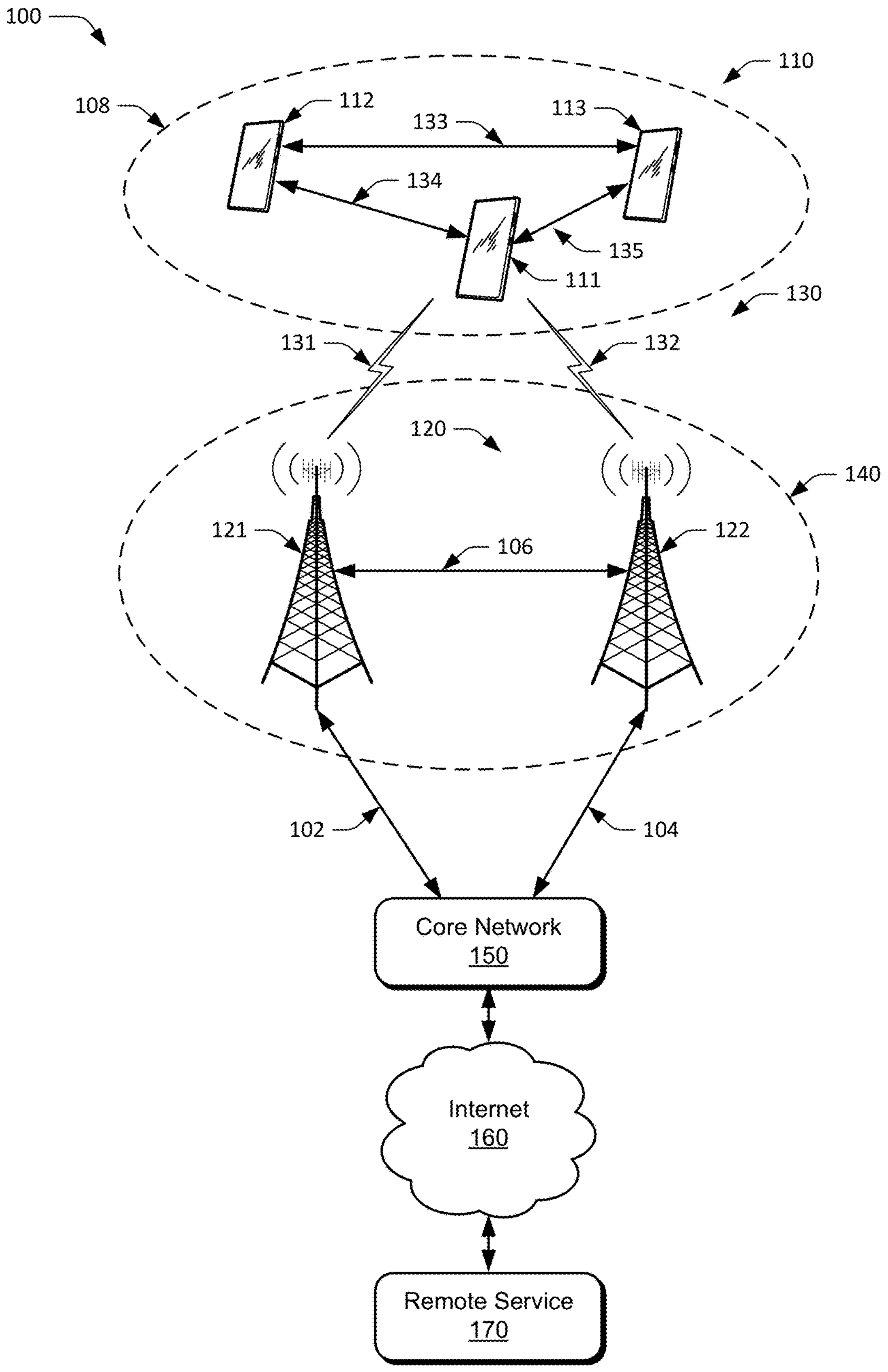
FIG. 1 illustrates an example operating environment that can be used to implement various aspects of signal adjustments in user equipment-coordination set joint transmissions.

In wireless communication systems, various factors affect a performance or efficiency of wireless connections between a base station and a user equipment (UE), such as a location of the UE affecting signal strength. To improve the performance and/or efficiency of these wireless connections, various aspects configure and/or establish a user equipment-coordination set (UECS) to perform joint processing (e.g., joint transmission, joint reception) of communications for a target UE.

Generally, a UECS includes at least two UEs that communicate through a local wireless connection and/or sidelink (e.g., direct communication between two devices without going through a base station) to share or distribute signal-related information for downlink and/or uplink communications to a base station or other wireless network element. By having multiple UEs form a UECS for joint reception and/or joint transmission of downlink transmissions directed to (or uplink transmissions from) a target UE within the UECS, the UEs in the UECS coordinate in a manner similar to a distributed antenna to improve the effective signal quality between the target UE and the base station. Downlink transmissions intended for the target UE can be transmitted to the multiple UEs in the UECS. Each of the UEs demodulates and samples the downlink transmission and then uses a local wireless connection to forward the samples to a single UE in the UECS, such as a coordinating UE or the target UE, for joint processing. In addition, uplink communications generated by the target UE can be distributed using the local wireless connection to the multiple UEs in the UECS for joint transmission to the base station. Coordinating joint transmission and reception of downlink and/or uplink transmissions for (or from) the target UE significantly increases the target UE's effective transmission power and/or received power, thus improving the effective signal quality.

In some scenarios, the individual transmissions from the multiple UEs adversely impact the joint transmissions when combined with one another. To illustrate, each UE in the UECS transmits, as part of a joint transmission, a respective uplink signal using a respective clock, which may result in uplink signals that have different phases from one another. As another example, the respective location of each UE relative to a receiving base station may differ, which may result in uplink signals with different phases from one another based on the different communication paths and/or different arrival times at the receiver. These factors make phase coherence between the individual uplink signals/transmissions difficult. Depending upon the different phases of the individual transmissions, combining the uplink signals at the base station receiver may produce destructive interference (e.g., a deep fade) in the joint transmission. In other words, at least two waveforms transmitted by two different UEs may have opposite or opposing displacement from one another and partially or fully cancel each other out when combined. This reduces a signal quality at the receiver, which reduces the UECS uplink range, uplink throughput, and uplink robustness (e.g., increases the sensitivity of uplink transmissions to impairments).

In aspects, a base station directs the UEs to adjust their respective uplink signals to modify the phase relationships between the uplink signals at a receiver and potentially reduce destructive interference. To illustrate, assume the base station receives a first joint transmission from a UECS and determines the first joint transmission fails to meet a performance threshold. For instance, the base station monitors signal-quality and/or link-quality measurements on the first joint transmission and identifies that the measurements do not meet an acceptable-performance threshold. Based on identifying that the first joint transmission fails to meet the performance threshold (and to mitigate signal degradation in subsequent joint transmissions), the base station directs the UEs participating in the UECS to adjust their respective uplink signal, such as by adding a phase shift, a time delay, timing advance, and/or modifying a beam used for transmission. In aspects, the base station directs the UEs to add random signal adjustments (e.g., adjustments selected arbitrarily and without bias) to their respective uplink signals.

Adding the signal adjustments to the individual uplink signals in a second joint transmission changes how the uplink signals combine at the base station relative to the first joint transmission and potentially improves the received signal quality at the base station. For retransmissions, such as hybrid automatic repeat request (HARQ) transmissions, the adjustments add diversity to the signals which can improve how the receiver recovers control-plane information and/or user-plane data. For instance, the diversity in the uplink signals can improve recovery processes that soft-combine the initial transmission with the retransmission. This also improves system performance by increasing uplink range, uplink throughput, and uplink robustness.

While features and concepts of the described systems and methods for signal adjustments in user equipment-coordination set joint transmissions can be implemented in any number of different environments, systems, devices, and/or various configurations, various aspects of signal adjustments in user equipment-coordination set joint transmissions are described in the context of the following example devices, systems, and configurations.

Example Environment

FIG. 1 illustrates an example environment 100, which includes multiple user equipment 110 (UE 110), illustrated as UE 111, UE 112, and UE 113. Each UE 110 can communicate with one or more base stations 120 (illustrated as base stations 121 and 122) through one or more wireless communication links 130 (wireless link 130), illustrated as wireless link 131 and wireless link 132. Each UE 110 in a UECS 108 (illustrated as UE 111, UE 112, and UE 113) can communicate with a coordinating UE of the UECS and/or a target UE in the UECS through a side-link, such as one or more local wireless connections (e.g., WLAN, Bluetooth, NFC, a personal area network (PAN), WiFi-Direct, IEEE 802.15.4, ZigBee, Thread, millimeter wavelength communication (mmWave), or the like) illustrated as wireless connections 133, 134, and 135. Alternatively, or additionally, each UE 110 can communicate using air interface resources allocated by the base station 120 for the side-link communications (e.g., air interface resources allocated for intra-UECS communications directly between UEs participating in the UECS). Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station, or the like, or any combination thereof.

The base stations 120 communicate with the UE 110 using one or more wireless links 131 and 132, which may be implemented as any suitable type of wireless link. The wireless links 131 and 132 include control-plane information and/or user-plane data, such as downlink user-plane data and control-plane information communicated from the base stations 120 to the UEs 110, uplink of other user-plane data and control-plane information communicated from the UEs 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), Sixth Generation (6G), and so forth. Multiple wireless links 130 may be aggregated in a carrier aggregation or multi-connectivity technology to provide a higher data rate for the UE 110. Multiple wireless links 130 from multiple base stations 120 may be configured for Coordinated Multipoint (CoMP) communication with the UE 110.

The base stations 120 collectively form a Radio Access Network 140 (e.g., RAN, Evolved Universal Terrestrial Radio Access Network, E-UTRAN, 5G NR RAN, or NR RAN). The base stations 121 and 122 in the RAN 140 are connected to a core network 150. The base stations 121 and 122 connect, at 102 and 104 respectively, to the core network 150 through an NG2 interface for control-plane information and using an NG3 interface for user-plane data communications when connecting to a 5G core network, or using an S1 interface for control-plane information and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at interface 106, to exchange user-plane data and control-plane information. The user equipment 110 may connect, via the core network 150, to public networks, such as the Internet 160 to interact with a remote service 170.

The base station 120 can specify a set of UEs (e.g., the UE 111, UE 112, and UE 113) to form a UECS (e.g., the UECS 108) for joint transmission and joint reception of signals for a target UE (e.g., the UE 112). The base station 120 may select UE 111 to act as the coordinating UE since the UE 111 is located between UE 112 and UE 113 or because the UE 111 is capable of communicating with each of the other UEs 112 and 113 in the UECS. The base station 120 selects UE 111 to coordinate messages and in-phase and quadrature (I/Q) samples sent between the base station 120 and the UEs 111, 112, 113 for the target UE 112. Communication among the UEs can occur using a side-link and/or a local wireless connection, such as a PAN, NFC, Bluetooth, WiFi-Direct, local mmWave link, etc. The UE 111, UE 112, and UE 113 perform joint reception by demodulating the radio frequency (RF) signals to produce baseband I/Q analog signals and sample the baseband I/Q analog signals to produce I/Q samples. The UE 112 and the UE 113 forward the I/Q samples along with system timing information (e.g., system frame number (SFN)) using the side-link and/or local wireless connection to the coordinating UE 111. The coordinating UE 111 then uses the timing information to synchronize and combine the I/Q samples and processes the combined signal to decode data packets for the target UE 112. The coordinating UE 111 then transmits the data packets to the target UE 112 using the side-link and/or local wireless connection.

When the target UE 112 has uplink data to send to the base station 120, the target UE transmits the uplink data to the coordinating UE 111 using the side-link and/or the local wireless connection. The coordinating UE 111 (also using the side-links and/or local wireless connections) distributes the uplink data, as I/Q samples, to each UE in the UECS 108. Each UE in the UECS 108 synchronizes with the base station 120 for timing information and its data transmission resource assignment. Then, all three UEs in the UECS 108 jointly transmit the uplink data to the base station 120. The base station 120 receives the transmitted uplink data from the UEs 111, 112, 113 and jointly processes the combined signal to decode the uplink data from the target UE 112.

Example Devices

Figure 2:
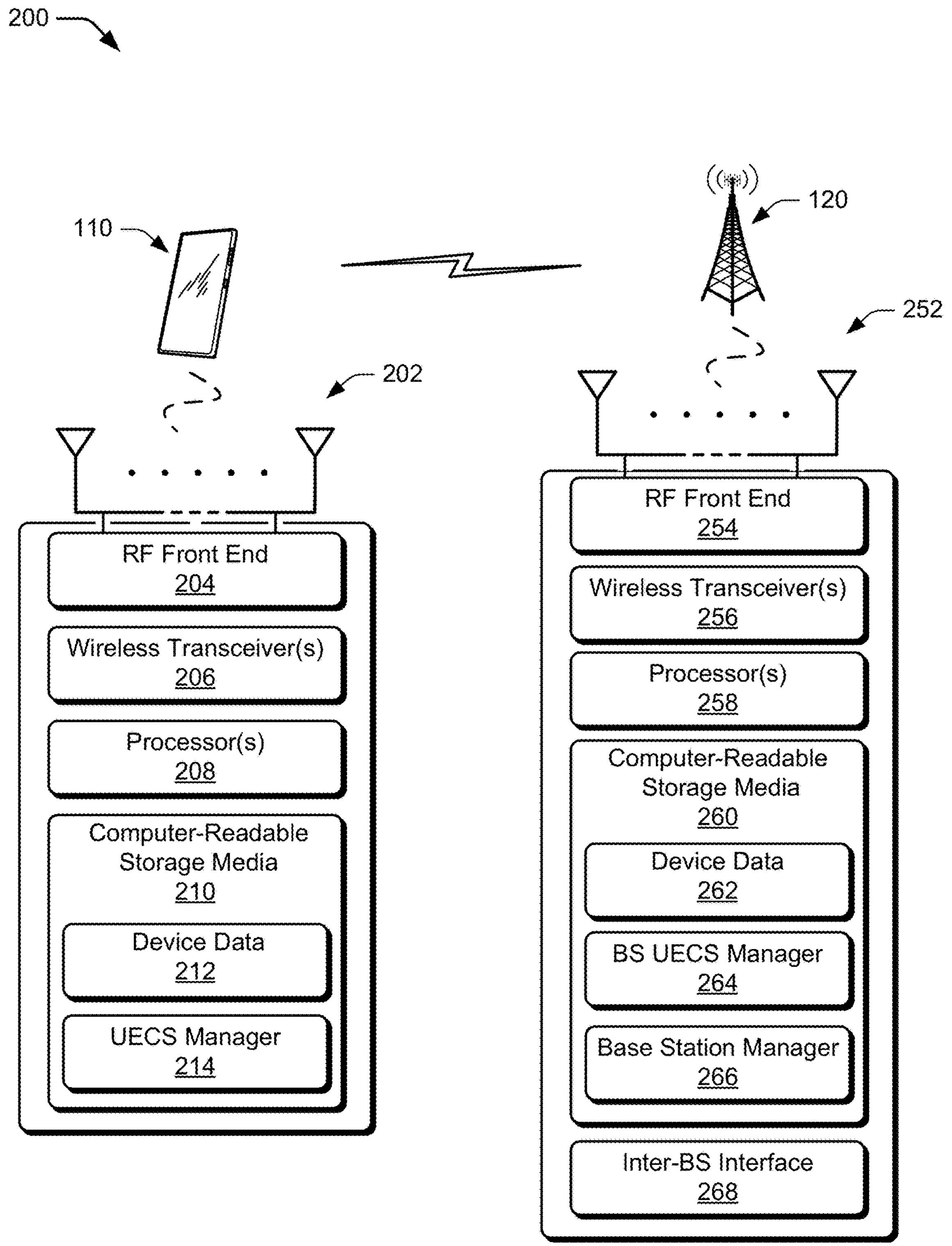
FIG. 2 illustrates an example device diagram of entities that can implement various aspects of signal adjustments in user equipment-coordination set joint transmissions.

FIG. 2 illustrates an example device diagram 200 of the UE 110 and base station 120. Generally, the device diagram 200 describes network entities that can implement various aspects of signal adjustments in user equipment-coordination set joint transmissions. FIG. 2 shows respective instances of the UE 110 and the base station 120. The UE 110 or the base station 120 may include additional functions and interfaces that are omitted from FIG. 2 for the sake of visual brevity. The UE 110 includes antennas 202, a radio-frequency front end 204 (RF front end 204), and one or more wireless transceivers 206 (e.g., radio-frequency transceivers), such as any combination of an LTE transceiver, a 5G NR transceiver, and/or a 6G transceiver for communicating with the base station 120 in the RAN 140. The RF front end 204 of the UE 110 can couple or connect the wireless transceivers 206 to the antennas 202 to facilitate various types of wireless communication.

The antennas 202 of the UE 110 may include an array of multiple antennas that are configured in a manner similar to or different from each other. The antennas 202 and the RF front end 204 can be tuned to, and/or be tunable to, one or more frequency bands defined by communication standards (e.g., 3GPP LTE, 5G NR) and implemented by the wireless transceiver(s) 206. Additionally, the antennas 202, the RF front end 204, and/or the wireless transceiver(s) 206 may be configured to support beam-sweeping for the transmission and reception of communications with the base stations 120. By way of example and not limitation, the antennas 202 and the RF front end 204 can be implemented for operation in sub-gigahertz bands, sub-6 GHz bands, and/or above-6 GHz bands that are defined by the 3GPP LTE and 5G NR communication standards (e.g., 57-64 GHz, 28 GHz, 38 GHz, 71 GHz, 81 GHz, or 92 GHz bands).

The UE 110 also includes processor(s) 208 and computer-readable storage media 210 (CRM 210). The processor 208 may be a single-core processor or a multiple-core processor implemented with a homogenous or heterogeneous core structure. The computer-readable storage media described herein excludes propagating signals. CRM 210 may include any suitable memory or storage device such as random-access memory (RAM), static RAM (SRAM), dynamic RAM (DRAM), non-volatile RAM (NVRAM), read-only memory (ROM), or Flash memory useable to store device data 212 of the UE 110. The device data 212 includes any combination of user data, multimedia data, applications, and/or an operating system of the UE 110. In implementations, the device data 212 stores processor-executable instructions that are executable by the processor(s) 208 to enable user-plane communication, control-plane signaling, and user interaction with the UE 110.

The CRM 210 of the UE 110 includes a user equipment-coordination set manager 214 (UECS manager 214). Alternatively or additionally, the UECS manager 214 may be implemented in whole or part as hardware logic or circuitry integrated with or separate from other components of the UE 110. In aspects, the UECS manager 214 receives directions to add one or more signal adjustments to an uplink signal used in a joint transmission by a UECS, such as a phase shift adjustment, a time delay adjustment, a timing advance, and/or a change in a selected beam for transmission. This includes receiving the directions from a base station (when the UE 110 acts as a coordinating UE) and/or from a coordinating UE (when the UE 110 acts as a non-coordinating UE). In aspects, the UECS manager 214 randomly selects the signal adjustment, while in other aspects, the UECS manager 214 receives the signal adjustment from another entity, such as from a base station over a cellular network link (when the UE 110 acts as a coordinating UE) and/or from a coordinating UE over a side-link (when the UE 110 acts as a non-coordinating UE). The UECS manager 214 alternatively or additionally manages when the UE 110 applies the signal adjustment to an uplink signal (e.g., using digital signal processing (DSP) techniques and/or analog radio frequency (RF) techniques), such as based on timing information and/or adjustment conditions as further described.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Remote Radio Head (RRH), and/or Remote Radio Unit (RRU). The base station 120 includes antennas 252, a radio-frequency front end 254 (RF front end 254), one or more wireless transceiver(s) 256 (e.g., radio-frequency transceivers) for communicating with the UE 110, such as LTE transceivers, 5G NR transceivers, and/or 6G transceivers. The RF front end 254 of the base station 120 can couple or connect the wireless transceivers 256 to the antennas 252 to facilitate various types of wireless communication. The antennas 252 of the base station 120 may include an array of multiple antennas that are configured in a manner similar to or different from each other. The antennas 252 and the RF front end 254 can be tuned to, and/or be tunable to, one or more frequency bands defined by communication standards (e.g., 3GPP LTE, 5G NR) and implemented by the wireless transceivers 256. Additionally, the antennas 252, the RF front end 254, and/or the wireless transceivers 256 may be configured to support beamforming, such as Massive-MIMO, for the transmission and reception of communications with the UE 110.

The base station 120 also includes processor(s) 258 and computer-readable storage media 260 (CRM 260). The processor 258 may be a single-core processor or a multiple-core processor composed of a variety of materials, such as silicon, polysilicon, high-K dielectric, copper, and so on. CRM 260 may include any suitable memory or storage device such as RAM, SRAM, DRAM, NVRAM, ROM, or Flash memory useable to store device data 262 of the base stations 120. The device data 262 includes network-scheduling data, radio resource-management data, applications, and/or an operating system of the base station 120, which are executable by processor(s) 258 to enable communication with the UE 110.

In aspects, the CRM 260 of the base station 120 also includes a base station-user equipment-coordination set manager 264 (BS UECS manager 264) for managing UECS communications with the UE 110 and/or the UECS 108. Alternatively or additionally, the BS UECS manager 264 may be implemented in whole or part as hardware logic or circuitry integrated with or separate from other components of the base station 120. In aspects, the BS UECS manager 264 selects UEs to include in a UECS (e.g., the UECS 108), such as by analyzing signal-quality and/or link-quality measurements, by analyzing UE-location information, by analyzing UE-capability information, and so forth. Alternatively or additionally, the BS UECS manager 264 analyzes (received) joint transmissions from the UECS and determines when the joint transmissions fail to meet a performance metric. Based on determining a joint transmission fails to meet the performance metric, the BS UECS manager 264 directs the UEs in the UECS to add one or more signal adjustments to a subsequent transmission, such as a retransmission for a HARQ process, a retransmission for a random access transmission, and so forth. For example, the BS UECS manager 264 directs the UEs to add the one or more signal adjustments by communicating directions to the coordinating UE. This includes the BS UECS manager 264 communicating adjustment conditions on when to apply the signal adjustments, sets of adjustment options, ranges for selecting the signal adjustments, respective signal adjustments for each UE, and so forth. The BS UECS manager 264 can direct the UEs to apply any combination of signal adjustments, such as a phase shift adjustment, a time delay adjustment, and/or a beam-transmission adjustment.

The CRM 260 also includes a base station manager 266 for managing various functionalities and communication interfaces of the base stations 120. Alternatively or additionally, the base station manager 266 may be implemented in whole or in part as hardware logic or circuitry integrated with or separate from other components of the base stations 120. In at least some aspects, the base station manager 266 configures the antennas 252, RF front end 254, and wireless transceivers 256 for communication with the UE 110 (e.g., the wireless link 131, the wireless link 132). The base station 120 sometimes includes a core network interface (not shown) that the base station manager 266 configures to exchange user-plane data and control-plane information with core network functions and/or entities.

The base station 120 includes an inter-base-station interface 268, such as an Xn and/or X2 interface, which the base station manager 266 configures to exchange user-plane and control-plane data between another base station 120, to manage the communication of the base stations 120 with the UE 110. The base station 120 also includes a core network interface (not shown) that the base station manager 266 configures to exchange user-plane data and control-plane information with core network functions and/or entities.

Signal Adjustments in User Equipment-Coordination Sets

UECSs perform joint transmission and/or joint reception of wireless signals to improve the performance and/or efficiency of a wireless connection with a base station. A UECS, as one example, performs joint transmission by a coordinating UE transmitting, to each non-coordinating UE, I/Q samples over a side-link, where the I/Q samples correspond to an uplink transmission from a target UE to the base station. In some aspects, the coordinating UE includes timing information with the I/Q samples to time-align uplink transmissions from the UEs in the UECS. Based on the I/Q samples and timing information, each UE transmits a respective uplink signal to the base station. The base station receives the individual uplink signals as a joint transmission (e.g., the individual uplink signals in a combined form). Providing I/Q samples to each UE provides uniformity between the individual uplink wireless signals that form the joint transmission. However, because each UE uses a transmitter driven by an independent clock, the individual uplink signals may lack phase coherence. Alternatively or additionally, the UEs may operate at different locations relative to the base station such that the uplink signals arrive at the base station at varying times, resulting in phase shifts between the uplink signals. These factors may contribute to fading at the receiver and prevent the base station from recovering the data and/or information included in the joint transmission.

In aspects, a base station directs the UEs of a UECS to add signal adjustments to respective uplink transmissions, such as phase shifts, time delays, timing advances, and/or transmission-beam changes, to add diversity and/or potentially improve a signal quality of a second joint transmission. This can include directing the UEs to add random adjustments (e.g., adjustments selected arbitrarily and without bias) and/or communicating sets of adjustment options or ranges for selecting the signal adjustments. As one example, the base station receives a first joint transmission from the UECS and, based on analyzing the first joint transmission, determines the first joint transmission fails to meet a performance level. To illustrate, the base station measures an (observed) uplink signal-to-interference-plus-noise ratio (SINR) and/or an (observed) uplink block error rate (BLER) on the first joint transmission and compares the uplink SINR and/or the uplink BLER to a performance threshold. In response to determining the first joint transmission fails to meet the performance level, the base station directs the UECS to add signal adjustments to the individual uplink signals of a second joint transmission. This can include the base station directing the UECS to add the signal adjustments without knowledge of the signal adjustment amount (e.g., phase shift amount, time delay amount, timing advance amount, selected transmission-beam) used by UE.

In response to receiving a second joint transmission, the base station determines whether the signal adjustments improved a signal quality of the second joint transmission (relative to the first joint transmission) and/or whether the second joint transmission meets a performance threshold. If the second joint transmission fails to meet the performance threshold, the base station may direct the UECS to add a different signal adjustment. Alternatively or additionally, the base station may soft-combine the subsequent transmission with the first joint transmission, such as in a HARQ process, and determine whether the subsequent transmission fails to meet the performance threshold (e.g., based on HARQ information). If the second joint transmission meets the performance threshold, the base station proceeds with processing the joint transmission to recover control-plane information and/or user-plane data. By directing the UEs participating in the UECS to add signal adjustments to the individual uplink signals, the base station changes the displacement of the individual uplink signals relative to one another based on past transmissions, which may improve a signal quality, mitigate signal degradation, and/or add diversity to recovery procedures. This can also improve system performance by increasing uplink range, uplink throughput, and uplink robustness by improving control-plane information and/or user-plane data recovery.

Figure 3:
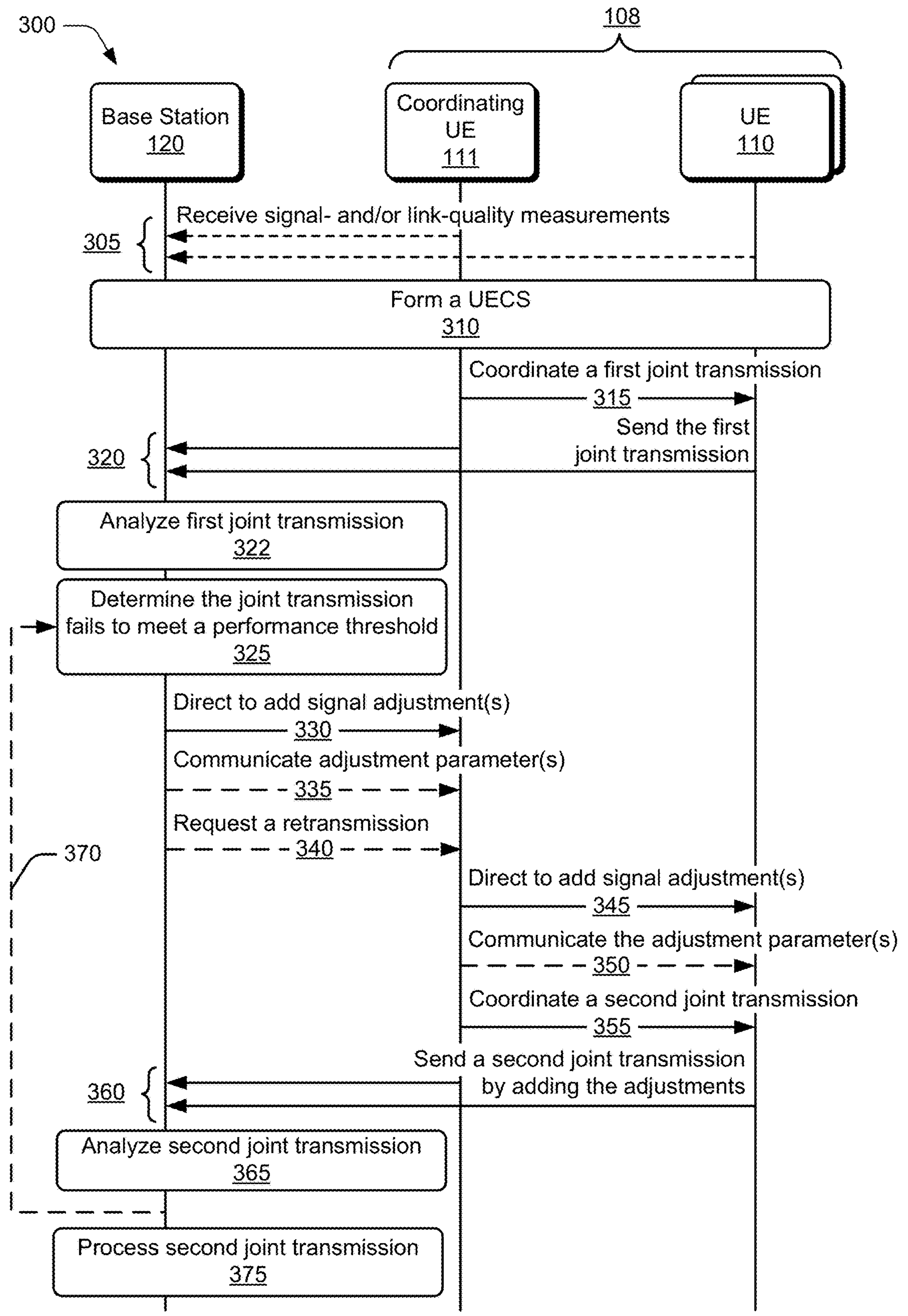
FIG. 3 illustrates an example transaction diagram between various network entities in accordance with various aspects of signal adjustments in user equipment-coordination set joint transmissions.

FIG. 3. illustrates an example control and data transaction diagram in accordance with one or more aspects of signal adjustments in user equipment-coordination set joint transmissions. In aspects, a control and data transaction diagram 300 includes control and data transactions among a base station (e.g., the base station 120), a coordinating UE of a UECS (e.g., the UE 111), and one or more non-coordinating UEs participating in the UECS (e.g., the UE 110)). The example control and data transactions included in the diagram 300 may be implemented using aspects as described with reference to any of FIGS. 1, 2, and 4-6.

As illustrated, at 305, the UE 111 and/or the other UE(s) 110 optionally communicate signal-quality measurements, link-quality measurements, measurement reports, and/or other values to the base station 120. For instance, as part of establishing and/or maintaining a wireless link with each of the UE 111 and/or the other UEs 110, the base station 120 transmits a (respective) radio resource control (RRC) reconfiguration message (not illustrated) that directs each UE to perform measurements. In response to the RRC reconfiguration message, the UEs communicate respective signal and/or link-quality measurements, such as measurement reports, values, or other feedback. Alternatively or additionally, the base station 120 communicates threshold values to each of the UE 111 and/or the other UEs 110 (e.g., a same threshold value or different threshold values) that indicate a trigger to send the respective signal-quality measurements, link-quality measurements, and/or measurement reports. In some aspects, the base station 120 generates signal-quality and/or link-quality measurements using uplink signals received from each of the UEs (e.g., the UE 111 and/or the other UEs 110).

At 310, the base station 120 directs at least the UE 111 and the other UEs 110 to form a UECS (e.g., the UECS 108). In aspects, to form the UECS, the base station 120 selects which UEs to include in the UECS based on analyzing the signal-quality measurements, link-quality measurements, UE capabilities, estimated UE-locations, measurement reports, and/or other characteristics received at 305. For instance, the base station 120 selects UEs that are within a threshold distance to one another, UEs that indicate they have UECS capabilities, UEs with more than a first threshold value of battery power remaining, UEs with received signal strength above a second threshold value, UEs with similar capabilities (e.g., processing power, memory size), and so forth.

Forming the UECS can include signaling transactions between the base station 120 and the UEs. These signaling transactions, such as signaling transactions corresponding to the base station 120 communicating directly with each UE, are not illustrated here for visual brevity. To illustrate, the base station 120 transmits a request message (e.g., a configuration message) that directs the UE 111 to coordinate the joint transmission and reception of the data intended for a target UE. In at least one example, the base station 120 transmits a signal to each UE (e.g., the UE 111, the other UEs 110) that directs each UE to participate in joint reception of downlink data for a target UE, such as by down-converting and sampling an RF signal to determine In-phase/Quadrature (I/Q) baseband signals and then forwarding the baseband I/Q samples to the coordinating UE (UE 111) for decoding of the data at the coordinating UE.

At some point in time after forming the UECS, at 315, the coordinating UE 111 coordinates a first joint transmission to the base station 120, such as a joint transmission of uplink control-plane information and/or uplink user-plane data from a target UE participating in the UECS and directed to the base station 120. For example, the coordinating UE 111 receives an uplink transmission (e.g., that includes I/Q samples) from the target UE over a first side-link (not illustrated in FIG. 3) and distributes the uplink transmission, as I/Q samples, to each UE in the UECS 108 as part of coordinating the joint transmission. In some aspects, the coordinating UE 111 communicates timing information to each non-coordinating UE, such as a time delay and/or a time advance, to adjust when each non-coordinating UE transmits the respective uplink transmission. In other words, the coordinating UE 111 adjusts the transmission times to mitigate timing-misalignments between the UEs participating in the UECS. In some aspects, the joint transmission corresponds to a hybrid automatic repeat request (HARQ) process at the UE.

At 320, the coordinating UE 111 and the non-coordinating UEs 110 participating in the UECS 108 send the first joint transmission to the base station 120. To illustrate, the UEs participating in the UECS (e.g., the coordinating UE 111, the non-coordinating UEs 110) each transmit a respective uplink transmission to the base station 120 based on the I/Q samples from the coordinating UE 111 and/or timing information. At 322, the base station 120 analyzes the first joint transmission. To illustrate, the base station 120 generates one or more signal-quality and/or link-quality metrics and analyzes the metrics to determine whether the second joint transmission fails to meet a performance metric.

At 325, and based on analysis of the received the joint transmission analyzed at 322, the base station 120 determines the joint transmission fails to meet a performance threshold. In aspects, the base station 120 generates one or more signal-quality and/or link-quality measurements using the joint transmission and compares the signal-quality and/or link-quality measurements to performance thresholds. To illustrate, the base station measures an (observed) uplink SINR on the joint transmission and determines the uplink SINR falls below a first performance threshold. Alternatively or additionally, the base station determines an (observed) uplink BLER and determines the uplink BLER exceeds a second performance threshold. As yet another example, the base station determines the joint transmission fails to meet the performance threshold based on HARQ information (e.g., first transmission error rate, second transmission error rate, maximum retransmissions). However, the base station may use other signal-quality and/or link-quality measurements as well, such as a received signal strength indicator (RSSI), channel quality indicator (CQI) information, channel state information (CSI), Doppler feedback, Quality of Service (QoS), timing measurements, error metrics, and so on.

At 330 and based on determining the joint transmission fails to meet a performance threshold, the base station 120 directs the UEs participating in the UECS to add one or more signal adjustments to a second joint transmission, such as a phase shift adjustment, a time delay adjustment, a timing advance adjustment, and/or a transmission-beam change. As one example, the base station 120 signals the coordinating UE 111 over a cellular wireless network to indicate to add the one or more signal adjustments, and the coordinating UE 111 forwards directions to each UE using side-link communications. This can include the UECS jointly receiving the signaling (directed to the coordinating UE 111) from the base station over the cellular wireless network. As another example, the base station 120 sets a Boolean value, an enumeration field, an information element, or a toggle flag in a communication to the coordinating UE 111. To illustrate, setting a Boolean field to true directs the coordinating UE 111 to add signal adjustments to the individual uplink signals, while setting the Boolean field to false directs the coordinating UE 111 to stop adding signal adjustments to the individual uplink signals. In some aspects, the base station 120 specifies a range or a set of (distinct) adjustment options to the coordinating UE 111 for selecting the signal adjustments as further described at 335.

In aspects, the base station 120 transmits the directions to add the one or more signal adjustments in downlink control information (DCI), such as by toggling a field in the DCI. Alternatively or additionally, the DCI includes grant information for the second joint transmission (and corresponding signal adjustments applied to the individual uplink signals of the second joint transmission). In some aspects, the base station 120 directs the UEs participating in the UECS to add the one or more signal adjustments by transmitting a radio resource control (RRC) message to the coordinating UE 111.

At 335, the base station 120 optionally communicates adjustment parameters to the coordinating UE 111. While shown as a separate transaction in the diagram 300, the base station 120 can communicate the adjustment parameters as described at 335 with the directions to add the signal adjustments as described at 330 in a single signaling transaction. As one example, the base station 120 communicates the adjustment parameters in the DCI that includes an indication to apply the signal adjustments and/or an uplink grant for the subsequent transmission. In some aspects, the base station 120 implicitly directs the coordinating UE 111 to add the one or more signal adjustments by communicating the adjustment parameters. Thus, the base station 120 may combine the signaling transactions described at 330 and at 335 in a single signaling transaction.

The base station 120 optionally communicates a variety of adjustment parameters, such as periodicity and/or timing information (e.g., time slot information, frame information, timing offset information) for when to apply the signal adjustments. Alternatively or additionally, the base station 120 communicates, as part of the adjustment parameters, adjustment conditions that specify when to apply or change the signal adjustment amounts. To illustrate, the base station 120 indicates to apply and/or change the signal adjustment amount each time the UECS receives (by way of the coordinating UE 111) directions to change a modulation coding scheme (MCS) and/or in response to receiving a HARQ retransmission request. Alternatively, the base station 120 indicates to apply and/or change the signal adjustment amounts on each joint transmission. For example, the base station 120 directs the UECS to change the signal adjustment amount once and apply the same signal adjustment amount for each second joint transmission (until directed otherwise) or directs the UECS to change the signal adjustment amount for each joint transmission. In some aspects, the base station 120 directs the UECS to apply and/or change the signal adjustments for configured grants, for dynamic grants, and/or for both configured grants and dynamic grants.

In some aspects, the base station 120 optionally communicates a set of (distinct) adjustment options, such as a set of phase shift adjustment options, a set of time delay adjustment options, a set of timing advance adjustment options, and/or a set of transmission-beam adjustment options, and directs each UE in the UECS (by way of the coordinating UE 111) to randomly select a respective adjustment from the set. Alternatively or additionally, the base station 120 communicates a range (e.g., a phase shift range, a time delay range) and directs each UE in the UECS (by way of the coordinating UE 111) to randomly select a respective signal adjustment within the specified range. As one example, at 335, the base station 120 communicates a set of phase shift values to the coordinating UE 111 that includes ten distinct options that span a phase range (e.g., −90 degrees to +90 degrees). Alternatively, the base station 120 communicates the phase range and directs each UE to select a phase shift that falls within the phase range. As another example, the base station 120 communicates a set of time delay values that span a time range based on a cyclic prefix (e.g., the time range corresponds to a fraction of the cyclic prefix) or communicates the time range. In some aspects, the base station 120 communicates, as the set of adjustment options, a set of beam identifiers that correspond to a set of beam with transmission directions that span a spatial range. In some aspects, the base station 120 communicates multiple sets of adjustment options and directs each UE (by way of the coordinating UE 111) to use a different (respective) set of adjustment options. To illustrate, the base station 120 communicates multiple sets of phase shift adjustment options and directs each UE to use a different set of phase shift adjustment options.

In aspects, the base station 120 directs the coordinating UE 111 (either implicitly or explicitly) to (i) communicate the set of adjustment options (and/or ranges) to each UE participating in the UECS and (ii) direct each UE to select (arbitrarily and without bias) a respective signal adjustment from the set of adjustment options (and/or ranges), which sometimes includes directions for each UE to perform autonomous selection based on adjustment conditions as further described. Alternatively, the base station 120 directs the coordinating UE 111 to select and communicate a respective signal adjustment for each UE from the set of adjustment options or ranges. In some aspects, the base station 120 selects and communicates the respective signal adjustment for each UE participating in the UECS as part of the adjustment parameters. To illustrate, the base station, the coordinating UE, and/or each UE select any combination of respective phase shifts, respective time delays, timing advances, and/or transmission beams as further described.

At 340, the base station 120 optionally requests, as the second joint transmission that uses the signal adjustments, a retransmission of the joint transmission received at 320. For instance, assume the base station 120 identifies an association between the joint transmission received at 320 and a HARQ process at a target UE of the UECS. Based on determining the joint transmission failed to meet the performance threshold at 325, the base station 120 may request a HARQ retransmission at 340. As another example, the base station 120 may request a random access channel (RACH) retransmission. While shown as a separate signaling transaction in the diagram 300, the base station 120 may request the retransmission in combination with the adjustment parameters as described at 335 and/or with the directions to add the signal adjustments as described at 330.

At 345, the coordinating UE 111 directs the non-coordinating UEs 110 to add a respective signal adjustment to the individual uplink signals for a second joint transmission. In some aspects, at 350, the coordinating UE 111 optionally communicates one or more of the adjustment parameters received at 335 to the non-coordinating UEs 110, which may be combined into a single signaling transaction with the directions at 345 as further described. At times, such as when the coordinating UE 111 communicates adjustment conditions for autonomous selection of adjustment parameters, the coordinating UE 111 may not communicate adjustment parameters in subsequent passes of an iterative loop. The coordinating UE 111 indicates any combination of sets of adjustment options, adjustment conditions, timing information, and so forth. In some aspects, the coordinating UE 111 randomly selects and communicates the respective signal adjustments for each non-coordinating UE 110, while in other aspects, the coordinating UE 111 communicates respective signal adjustments selected by the base station 120.

Alternatively, the coordinating UE 111 directs each non-coordinating UE 110 to randomly select the respective signal adjustment, which can include the coordinating UE 111 communicating adjustment conditions that direct the non-coordinating UEs to autonomously select the respective adjustment. To illustrate, assume the coordinating UE 111 (*i*) directs each non-coordinating UE 110 to randomly select the respective signal adjustment from a set of adjustment options and (ii) indicates to change the respective signal adjustment for every second joint transmission based on an adjustment condition (e.g., every HARQ retransmission request, every MCS change). In response, each UE participating in the UECS 108 selects a first respective signal adjustment for a first joint transmission, autonomously selects a second respective signal adjustment for a second joint transmission, and so forth, without needing further adjustment directions from the coordinating UE 111. By configuring each UE in the UECS to perform autonomous adjustment selection, a coordinating UE 111 configures the non-coordinating UEs 110 once, instead of for each joint transmission, thus reducing adjustment control overhead communications between the coordinating UE 111 and the non-coordinating UEs 110.

At 355, the coordinating UE 111 coordinates a second joint transmission to the base station 120. To illustrate, the coordinating UE 111 coordinates a HARQ retransmission and/or a random access retransmission of the first joint transmission sent at 320. Alternatively, the coordinating UE 111 coordinates a second joint transmission for additional user-plane data and/or control-plane information (e.g., different user-plane data and/or control-plane information than sent in the first joint transmission).

At 360, the coordinating UE 111 and the non-coordinating UEs 110 send the second joint transmission by adding the signal adjustments to the individual uplink signals. To illustrate, each UE participating in the UECS 108 adds a phase shift and/or time delay in the respective transmission chain, such as in a baseband digital signal at a digital signal processing (DSP) step or in an analog radio frequency (RF) signal processing step. Alternatively or additionally, each UE sends the individual uplink signal as a respective beam selected as the signal adjustment by using multiple antenna and a corresponding transceiver to generate the beam.

At 365, the base station 120 analyzes the second joint transmission. To illustrate, and similar to that described at 325, the base station 120 generates one or more signal-quality and/or link-quality metrics and analyzes the metrics to determine whether the second joint transmission fails to meet a performance metric. In some aspects, the base station 120 soft-combines the second joint transmission and the first joint transmission, such as by performing a HARQ soft-combining procedure, and analyzes the soft-combined signal to determine whether the second joint transmission meets the performance metric.

Portions of the diagram 300 may iteratively repeat as shown at 370. For example, based on analyzing the second joint transmission at 365, the base station 120 sometimes determines that the second transmission fails to meet the performance threshold as described at 325. Based on determining the second joint transmission fails the performance metric, the base station 120 may direct the UECS to change and/or modify the signal adjustments applied to the individual uplink signals (e.g., a different signal adjustment from prior signal adjustments). In some aspects, the base station 120 communicates new adjustment parameters, while in other aspects, the base station 120 implicitly directs the UECS to use the previous adjustment parameters by not communicating new adjustment parameters. Similarly, the base station 120 optionally requests a retransmission of the second joint transmission. Based on receiving directions to add new signal adjustments, the coordinating UE 111 directs the non-coordinating UEs 110 to update and/or change the signal adjustments applied to the individual uplink signals and coordinates a third joint transmission. Based on directions from the coordinating UE 111, the UECS 108 sends a third joint transmission to the base station 120.

At times, the base station 120 determines that the second joint transmission (or second joint transmissions based on iterations) meets the performance metrics and proceeds at 375 to process the second joint transmission (and/or a soft-combined transmission that incorporates the second joint transmission) extract control-plane information and/or user-plane data. Thus, adding the signal adjustments to the individual uplink signals in a second joint transmission changes how the uplink signals combine at the base station relative to the first joint transmission. This potentially improves the received signal quality at the base station and/or the recovery process (e.g., by adding diversity to signals that are soft-combined) and improves system performance by increasing uplink range, uplink throughput, and uplink robustness.

Figure 4:
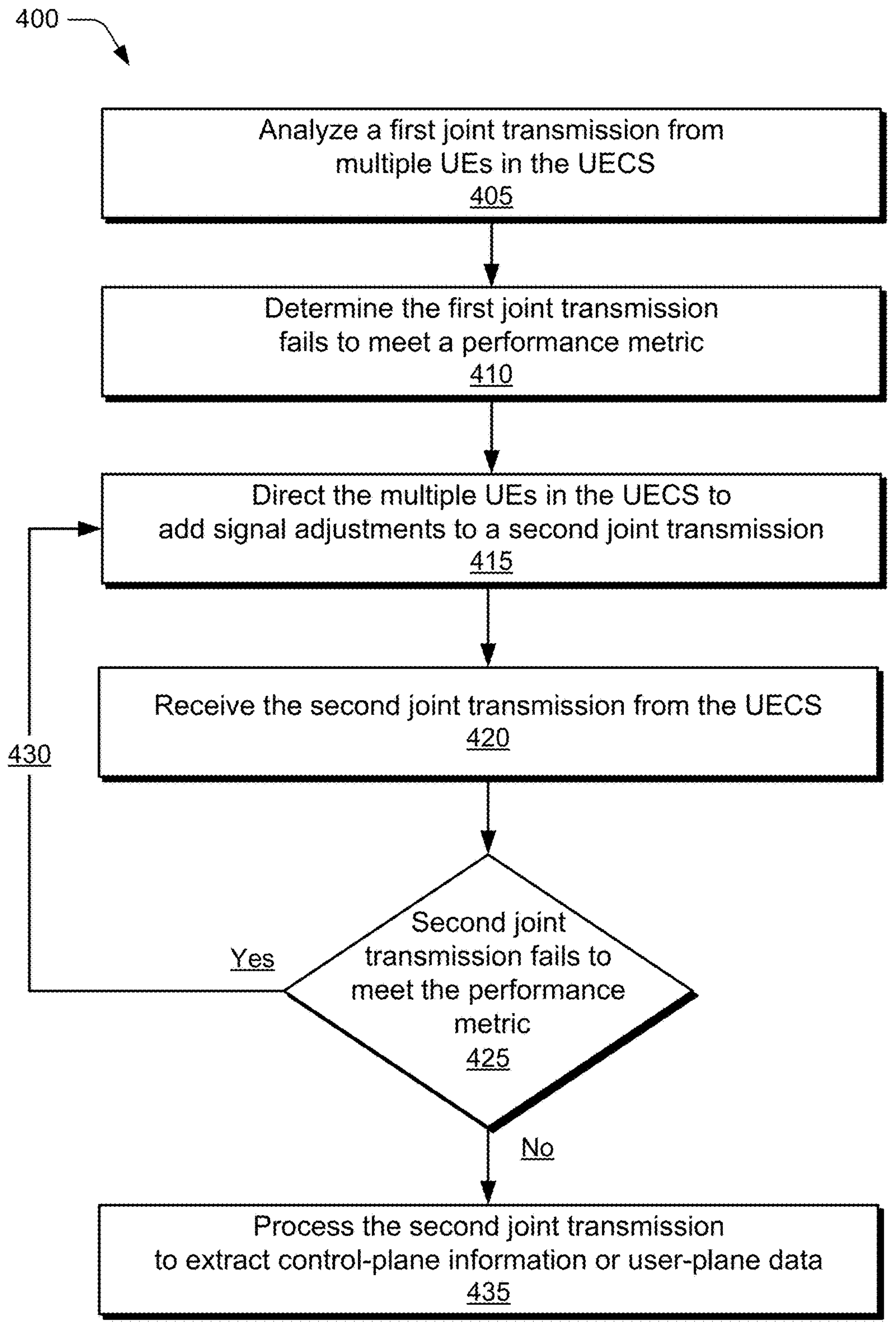
FIG. 4 illustrates an example method in accordance with various aspects of signal adjustments in user equipment-coordination set joint transmissions.

Example Methods for Signal Adjustments in User Equipment-Coordination Set Joint Transmissions Example methods 400, 500, and 600 are described with reference to FIG. 4, FIG. 5, and FIG. 6 in accordance with one or more aspects of signal adjustments in user equipment-coordination set joint transmissions. FIG. 4 illustrates an example method 400 used to perform aspects of signal adjustments in user equipment-coordination set joint transmissions performed by a base station, such as the base station 120 of FIG. 1.

At 405, a base station analyzes a first joint transmission from multiple UEs in a UECS, where the multiple UEs include a coordinating UE of the UECS and at least one non-coordinating UE in the UECS. For example, the base station (e.g., base station 120) analyzes a first joint transmission from the UECS (e.g., the UECS 108) as described at 322 of FIG. 3.

At 410, the base station determines the first joint transmission fails to meet a performance metric. The base station (e.g., base station 120), as one example, determines the first joint transmission fails to meet the performance threshold by measuring SINR and determining the SINR falls below a first performance threshold, or by measuring BLER and determining the BLER exceeds a second performance threshold as described at 325 of FIG. 3.

At 415, the base station directs the multiple UEs in the UECS to add signal adjustments to a second joint transmission. To illustrate, the base station (e.g., base station 120) directs the multiple UEs (e.g., the UE 111, the UE 112, the UE 113) by communicating a command to a coordinating UE (e.g., the UE 111) of the UECS (e.g., the UECS 108) as described at 330, at 335, and/or at 340 of FIG. 3.

At 420, the base station receives a second joint transmission from the UECS. For instance, the base station (e.g., the base station 120) receives the second joint transmission from the multiple UEs (e.g., the UE 111, the UE 112, the UE 113) in the UECS (e.g., the UECS 108) as described at 360 of FIG. 3.

At 425, the base station determines whether the second joint transmission fails to meet the performance metric. To illustrate, the base station (e.g., the base station 120) analyzes the second joint transmission by analyzing signal-quality and/or link-quality parameters as described at 365 of FIG. 3. Alternatively or additionally, the base station (e.g. the base station 120), soft-combines the second joint transmission with the first joint transmission, such as when the second joint transmission corresponds to a HARQ retransmission as described at 355 of FIG. 3.

At this point, if the base station determines that the second joint transmission fails to meet the performance metric, the method can proceed as shown at 430 based on determining the second joint transmission fails to meet the performance metric. At 415, the base station (e.g., the base station 120) directs the multiple UEs (e.g., the UE 111, the UE 112, the UE 113) to change the signal adjustments for a third joint transmission as described at 370 and at 325 of FIG. 3. Thus, the method may iteratively repeat and direct the UECS to change the adjustments.

Alternatively, the method can proceed as shown at 435 based on determining the second joint transmission meets the performance metric. At 435, the base station processes the second joint transmission to extract control-plane information or user-plane data. For example, as described at 375 of FIG. 3, the base station 120 may process a soft-combined version of the second joint transmission and the first joint transmission to extract and recover the control-plane information or user-plane data.

Figure 5:
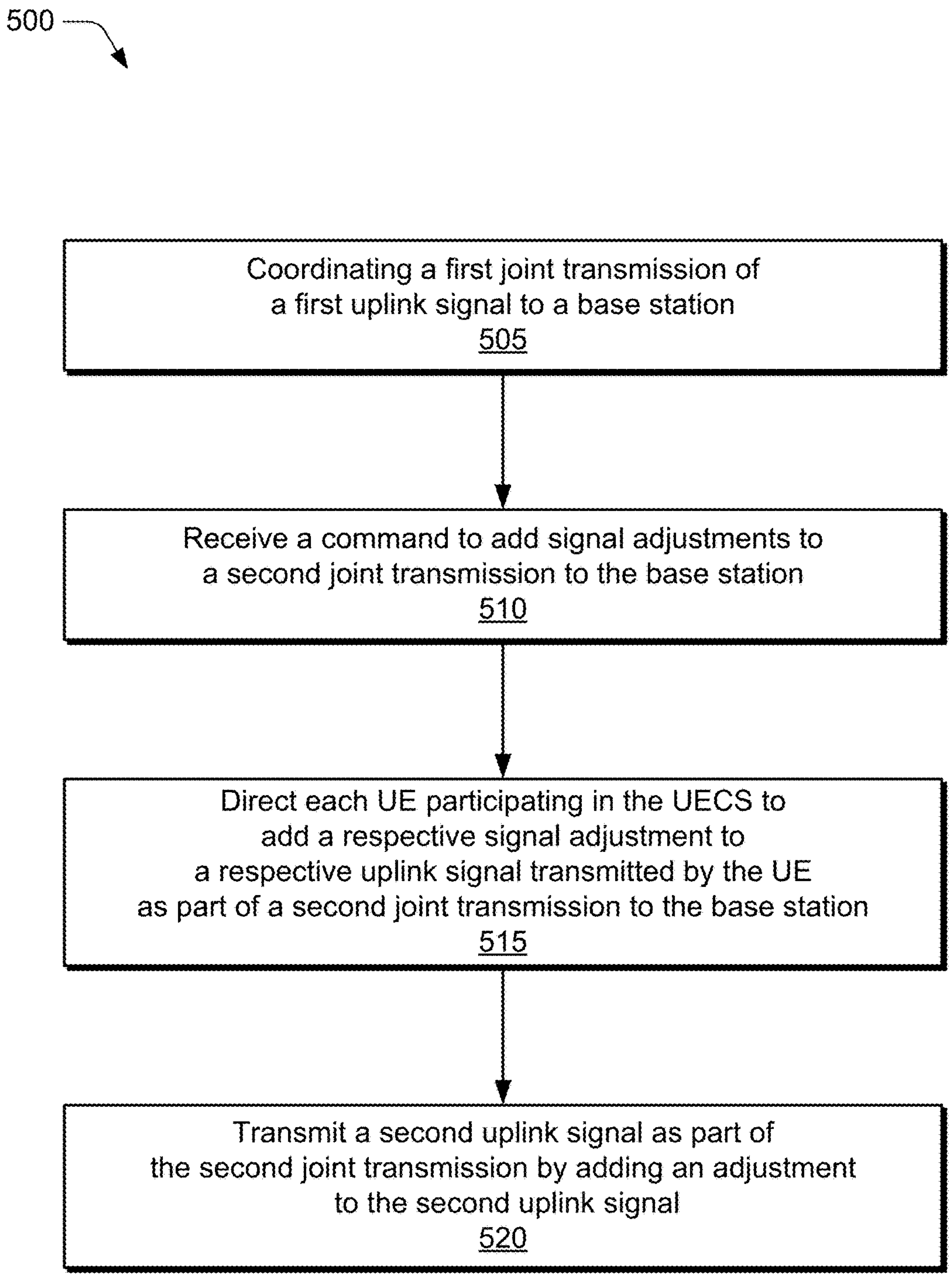
FIG. 5 illustrates an example method in accordance with various aspects of signal adjustments in user equipment-coordination set joint transmissions.

FIG. 5 illustrates an example method 500 used to perform aspects of signal adjustments in user equipment-coordination set joint transmissions performed by a coordinating UE of a UECS, such as the UE 111 of FIG. 1. At 505, a coordinating UE coordinates a first joint transmission of a first uplink signal to a base station. To illustrate, the coordinating UE (e.g., the UE 111) coordinates the first joint transmission of an uplink signal from a target UE (e.g., the UE 112) to the base station (e.g., the base station 120) using the UECS (e.g., the UECS 108) as described at 315 of FIG. 3.

At 510, the coordinating UE receives, from the base station, a command to add signal adjustments to a second joint transmission to the base station. The coordinating UE (e.g., the UE 111), for example, receives directions to add signal adjustments to the individual uplink signals as described at 330 of FIG. 3. This may include the coordinating UE (e.g., the UE 111) receiving adjustment parameters as described at 335 of FIG. 3 and/or a retransmission request as described at 340 of FIG. 3.

At 515, the coordinating UE directs each UE of the UECS to add a respective signal adjustment to a respective uplink signal transmitted by the UE as part of a second joint transmission to the base station. As one example, the coordinating UE (e.g., the UE 111) directs each UE of the UECS (e.g., the UE 112, the UE 113) to add a respective signal adjustment using a side-link as described at 345 of FIG. 3. This may include the coordinating UE (e.g., the UE 111) communicating adjustment parameters to the UEs (e.g., the UE 112, the UE 113) as described at 350 of FIG. 3.

At 520, the coordinating UE transmits a second uplink signal as part of the second joint transmission by adding a signal adjustment to the second uplink signal. To illustrate, the coordinating UE (e.g., the UE 111) transmits a second uplink signal by adding the signal adjustment to the second uplink signal as described at 360 of FIG. 3.

Figure 6:
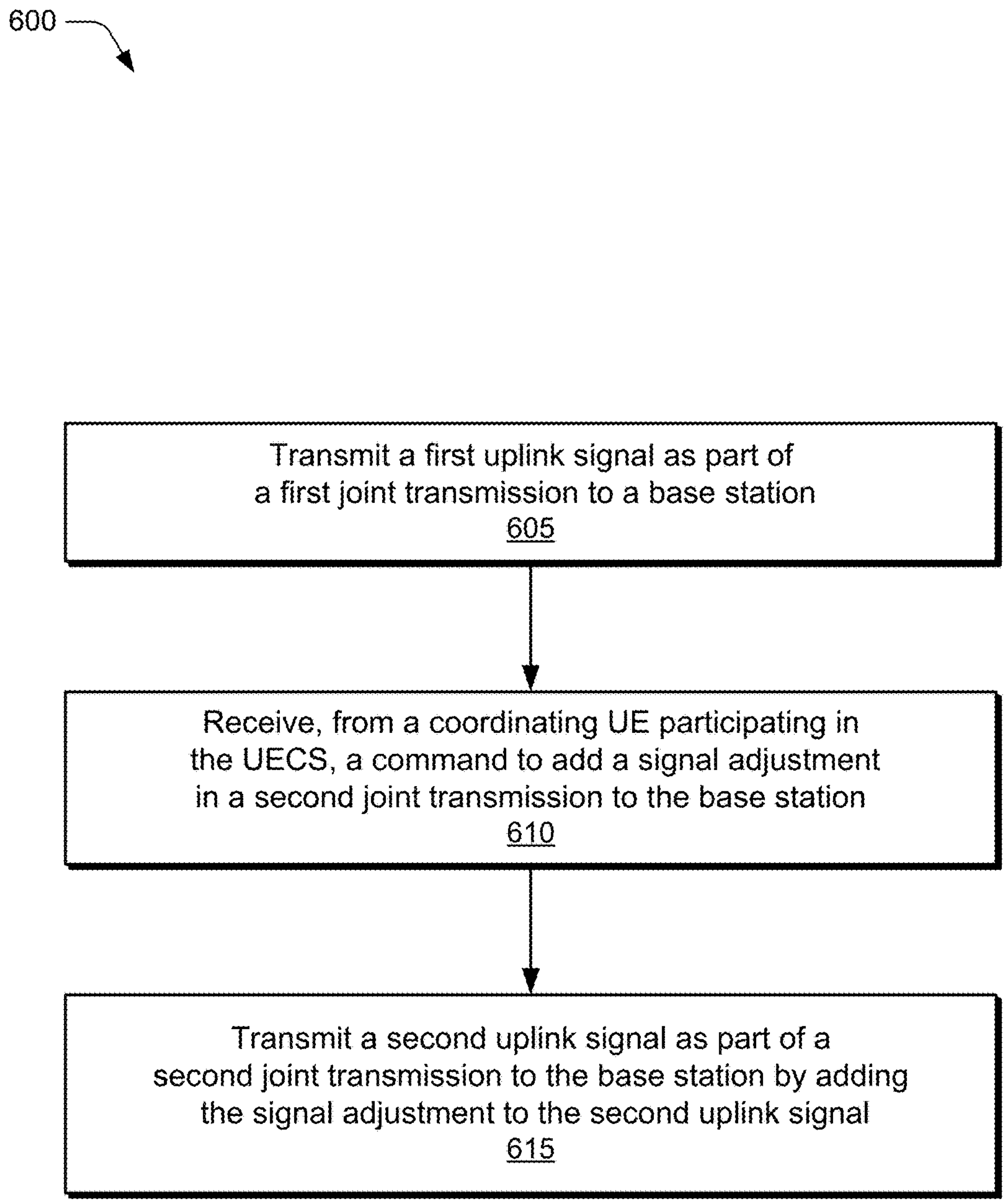
FIG. 6 illustrates an example method in accordance with various aspects of signal adjustments in user equipment-coordination set joint transmissions.

FIG. 6 illustrates an example method 600 used to perform aspects of signal adjustments in user equipment-coordination set joint transmissions performed by a non-coordinating UE of a UECS, such as the UE 112 and/or UE 113 of FIG. 1. At 605, a non-coordinating UE participating in a UECS transmits a first uplink signal as part of a first joint transmission to a base station. To illustrate, the non-coordinating UE (e.g., the UE 112, the UE 113) transmits the first joint transmission as described at 320 of FIG. 3.

At 610, the non-coordinating UE receives, from a coordinating UE participating in the UECS, a command to add a signal adjustment in a second joint transmission to the base station. For instance, the non-coordinating UE (e.g., the UE 112, the UE 111), receives the command from the coordinating UE (e.g., the UE 111) over a side-link as described at 345 of FIG. 3. Alternatively or additionally, the non-coordinating UE (e.g., the UE 112, the UE 111) receives adjustment parameters as described at 350 of FIG. 3.

At 615, the non-coordinating UE transmits a second uplink signal as part of a second joint transmission to the base station by adding the signal adjustment to the second uplink signal. The non-coordinating UE (e.g., the UE 112, the UE 113), as one example, adds the signal adjustment to the second uplink signal as described at 360 of FIG. 3.

The order in which the method blocks of the method 400, 500, and 600 are described is not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or additionally, any of the functionality described herein can be performed, at least in part, by one or more hardware logic components, such as, and without limitation, Field-Programmable Gate Arrays (FPGAs), Application-Specific Integrated Circuits (ASICs), Application-Specific Standard Products (ASSPs), System-on-Chip systems (SoCs), Complex Programmable Logic Devices (CPLDs), and the like.

In the following text some examples are described:

Example 1: A method performed by a base station for mitigating signal degradation in joint transmissions from a user equipment-coordination set, UECS, that includes multiple user equipments, UEs, the method comprising:
analyzing a first joint transmission from multiple UEs in the UECS;
determining the first joint transmission fails to meet a performance metric; and
directing the multiple UEs participating in the UECS to add signal adjustments to a second joint transmission.

Example 2: The method as recited in example 1, wherein the directing the multiple UEs in the UECS to add the signal adjustments further comprises:
transmitting a command to a coordinating UE of the UECS; and
directing the coordinating UE to communicate the command to at least one non-coordinating UE using a respective side-link.

Example 3: The method as recited in example 1 or example 2, wherein the directing the multiple UEs in the UECS to add the signal adjustments further comprises:
indicating a request for the signal adjustments with an uplink grant for a subsequent joint transmission from the UECS.

Example 4: The method as recited in any one of examples 1 to 3, wherein the directing the multiple UEs in the UECS to add the signal adjustments further comprises:
transmitting a set of adjustment options to the UECS; and
directing each UE of the multiple UEs to select the signal adjustments from the set of adjustment options.

Example 5: The method as recited in example 4, wherein the transmitting the set of adjustment options further comprises:
transmitting the set of adjustment options using downlink control information, DCI; or
transmitting the set of adjustment options using a radio resource control, RRC message.

Example 6: The method as recited in any one of examples 1 to 5, wherein the directing the multiple UEs in the UECS to add the signal adjustments further comprises:
directing the multiple UEs in the UECS to add, as the signal adjustments, one or more of: a phase shift;
a time delay;
a timing advance; or
a transmission-beam change.

Example 7: The method as recited in any one of examples 1 to 6, wherein the directing the multiple UEs in the UECS to add the signal adjustments further comprises:
directing the multiple UEs in the UECS to add random signal adjustments to their respective uplink signals.

Example 8: The method as recited in any one of examples 1 to 7, wherein the directing the multiple UEs in the UECS to add the signal adjustments further comprises:
indicating timing information that specifies when to add the signal adjustments.

Example 9: The method as recited in example 8, wherein the indicating the timing information further comprises:
indicating at least one of:
a periodicity;
time slot information; or
frame information.

Example 10: The method as recited in any one of examples 1 to 9, where the directing the multiple UEs in the UECS to add the signal adjustments further comprises:
communicating one or more adjustment conditions that indicate when to autonomously add or modify the signal adjustments.

Example 11: The method as recited in example 10, wherein the one or more adjustment conditions indicate at least one of:
a change to a modulation and coding scheme, MCS;
a hybrid automatic repeat request, HARQ, retransmission; or
every subsequent joint transmission.

Example 12: The method as recited in example 10 or example 11, wherein the directing the multiple UEs in the UECS to add the signal adjustments further comprises:
directing each UE of the multiple UEs to autonomously select a respective adjustment based on the one or more adjustment conditions.

Example 13: The method as recited in any one of examples 1 to 12, wherein the directing the multiple UEs in the UECS to add the signal adjustments further comprises:
selecting a respective signal adjustment for each UE of the multiple UEs; and
indicating the respective signal adjustment to each UE of the multiple UEs.

Example 14: The method as recited in any one of examples 1 to 13, wherein the determining the first joint transmission fails to meet the performance metric further comprises:
determining that an uplink signal-to-interference-plus-noise ratio, uplink SINR, falls below a first threshold value; or
determining that an uplink block error rate, uplink BLER, exceeds a second threshold value.

Example 15: The method as recited in any one of examples 1 to 14, further comprising:
receiving the second joint transmission from the UECS;
determining the second joint transmission fails to meet the performance metric; and
based on the determining the second joint transmission fails to meet the performance metric, directing the multiple UEs to change the signal adjustments for a third joint transmission.

Example 16: The method as recited in any one of examples 1 to 15, further comprising:

requesting, as the second joint transmission, a retransmission of the first joint transmission.

Example 17: A method performed by a coordinating user equipment, UE, of a user equipment-coordination set, UECS, for mitigating signal degradation in joint transmissions, the method comprising:

coordinating a first joint transmission of a first uplink signal from the UECS to a base station;

receiving, from the base station, a command to add signal adjustments to a second joint transmission to the base station; and directing one or more of the UEs in the UECS to add a respective signal adjustment to a respective uplink signal transmitted by the UE as part of a second joint transmission to the base station.

Example 18: The method as recited in example 17, further comprising:

selecting a signal adjustment from a set of adjustment options; and transmitting a second uplink signal as part of the second joint transmission by adding the signal adjustment to the second uplink signal.

Example 19: The method as recited in example 18, further comprising:

receiving the set of adjustment options from the base station in downlink control information, DCI; or receiving the set of adjustment options from the base station in a radio resource control message, RRC message.

Example 20: The method as recited in example 18 or example 19, further comprising:

selecting the respective signal adjustment for one or more of the UEs from the set of adjustment options and communicating the respective signal adjustment to the UE using a respective side-link; or directing one or more of the UEs in the UECS to select the signal respective adjustment from the set of adjustment options.

Example 21: The method as recited in any one of examples 17 to 20, wherein the directing one or more of the UEs participating in the UECS to add the respective signal adjustment further comprises:

directing one or more of the UEs to add, as the respective signal adjustment; one or more of:

a phase shift;

a time delay;

a timing advance; or a transmission-beam change.

Example 22: The method as recited in any one of examples 17 to 21, further comprising:

receiving, from the base station, timing information that specifies when to add the signal adjustments; and directing one or more of the UEs in the UECS to add the respective signal adjustment to the respective uplink signal based on the timing information.

Example 23: The method as recited in example 22, wherein receiving the timing information further comprises:

receiving at least one of:

a periodicity;

time slot information; or frame information.

Example 24: The method as recited in any one of examples 17 to 23, wherein receiving the command to add the signal adjustments in the second joint transmission further comprises:

receiving one or more adjustment conditions that indicate when to autonomously add or modify the signal adjustments.

Example 25: The method as recited in example 24, wherein the one or more adjustment conditions indicate at least one of:

a change to a modulation and coding scheme, MCS;

a hybrid automatic repeat request, HARQ, retransmission; or every subsequent joint transmission.

Example 26: A method performed by a non-coordinating user equipment, UE, in a user equipment-coordination set, UECS, for mitigating signal degradation in joint transmissions, the method comprising:

transmitting a first uplink signal as part of a first joint transmission to a base station;

receiving, from a coordinating UE participating in the UECS, a command to add a signal adjustment in a second joint transmission to the base station; and transmitting a second uplink signal as part of a second joint transmission to the base station by adding the signal adjustment to the second uplink signal.

Example 27: The method as recited in example 26, wherein the receiving the command to add the signal adjustment further comprises:

receiving an indication to add, as the signal adjustment, one or more of:

a phase shift;

a time delay;

a timing advance; or a transmission-beam change.

Example 28: The method as recited in example 26 or example 27, further comprising:

selecting the signal adjustment from a set of adjustment options; or receiving the signal adjustment from the coordinating UE.

Example 29: The method as recited in any one of examples 26 to 28, wherein the transmitting the second uplink signal as part of the second joint transmission further comprises:

transmitting the second uplink signal as a retransmission of the first uplink signal.

Example 30: The method as recited in any one of examples 26 to 29, further comprising:

receiving, from the coordinating UE, timing information that specifies when to add the signal adjustment; and adding the signal adjustment to the second uplink signal based on the timing information.

Example 31: The method as recited in any one of examples 26 to 30, wherein the receiving the timing information further comprises:

receiving at least one of:

a periodicity;

time slot information; or frame information.

Example 32: The method as recited in any one of examples 26 to 31, wherein the receiving the command to add the signal adjustment in the second joint transmission further comprises:

receiving one or more adjustment conditions that indicate when to autonomously add or modify the signal adjustment.

Example 33: The method as recited in example 32, wherein the one or more adjustment conditions indicate at least one of:

a change to a modulation and coding scheme, MCS;

a hybrid automatic repeat request, HARQ, retransmission; or every subsequent joint transmission.

Example 34: An apparatus comprising:

a processor; and computer-readable storage media comprising instructions, responsive to execution by the processor, for directing the apparatus to perform a method as recited in any one of examples 1 to 33.

Example 35: A computer-readable storage media comprising instructions that, responsive to execution by a processor, direct an apparatus to perform a method as recited in any one of examples 1 to 33.

Although aspects of signal adjustments in user equipment-coordination set joint transmissions have been described in language specific to features and/or methods, the subject of the appended claims is not necessarily limited to the specific features or methods described. Rather, the specific features and methods are disclosed as example implementations of signal adjustments in user equipment-coordination set joint transmissions, and other equivalent features and methods are intended to be within the scope of the appended claims. Thus, the appended claims include a list of features that can be selected in "any combination thereof," which includes combining any number and any combination of the listed features. Further, various different aspects are described, and it is to be appreciated that each described aspect can be implemented independently or in connection with one or more other described aspects.

What is claimed is:

1. A method performed by a base station for mitigating signal degradation in joint transmissions from a user equipment-coordination set (UECS) that includes multiple user equipments (UEs), the method comprising:

analyzing a first joint transmission from multiple UEs in the UECS;

determining the first joint transmission fails to meet a performance metric; and directing, via a command sent to a coordinating UE of the UECS, the multiple UEs participating in the UECS to add signal adjustments to a second joint transmission, the directing comprising directing the coordinating UE to direct the multiple UEs in the UECS to add random signal adjustments to their respective uplink signals.

2. The method as recited in claim 1, wherein the directing the multiple UEs in the UECS to add the signal adjustments further comprises:

sending the command to the coordinating UE of the UECS;

and directing the coordinating UE to communicate the command to at least one non-coordinating UE using a respective side-link.

3. The method as recited in claim 1, wherein the directing the multiple UEs in the UECS to add the signal adjustments further comprises:

transmitting a set of adjustment options to the UECS; and directing each UE of the multiple UEs to select the signal adjustments from the set of adjustment options.

4. The method as recited in claim 1, wherein the directing the multiple UEs in the UECS to add the signal adjustments further comprises:

directing the multiple UEs in the UECS to add, as the signal adjustments, one or more of:

a phase shift;

a time delay;

a timing advance; or a transmission-beam change.

5. The method as recited in claim 1, wherein the directing the multiple UEs in the UECS to add the signal adjustments further comprises:

indicating timing information that specifies when to add the signal adjustments.

6. The method as recited in claim 1, wherein the directing the multiple UEs in the UECS to add the signal adjustments further comprises:

selecting a respective signal adjustment for each UE of the multiple UEs; and indicating the respective signal adjustment to each UE of the multiple UEs.

7. The method as recited in claim 1, wherein the determining the first joint transmission fails to meet the performance metric further comprises:

determining that an uplink signal-to-interference-plus-noise ratio, uplink SINR, falls below a first threshold value; or determining that an uplink block error rate, uplink BLER, exceeds a second threshold value.

8. The method as recited in claim 1, further comprising:

requesting, as the second joint transmission, a retransmission of the first joint transmission.

9. A method performed by a coordinating user equipment (UE) of a user equipment-coordination set (UECS) for mitigating signal degradation in joint transmissions, the method comprising:

coordinating a first joint transmission of a first uplink signal from the UECS to a base station;

receiving, from the base station, a command to add signal adjustments to a second joint transmission to the base station, the command comprising a direction to add random signal adjustments to respective uplink signals of one or more UEs in the UECS; and communicating, to one or more of the UEs in the UECS, the command to add a respective signal adjustment to a respective uplink signal transmitted by the UE as part of a second joint transmission to the base station.

10. The method as recited in claim 9, further comprising:

selecting a signal adjustment from a set of adjustment options; and transmitting a second uplink signal as part of the second joint transmission by adding the signal adjustment to the second uplink signal.

11. The method as recited in claim 10, further comprising:

selecting the respective signal adjustment for one or more of the UEs from the set of adjustment options and communicating the respective signal adjustment to the UE using a respective side-link; or directing one or more of the UEs in the UECS to select the respective signal adjustment from the set of adjustment options.

12. The method as recited in claim 9, wherein the directing one or more of the UEs participating in the UECS to add the respective signal adjustment further comprises:

directing one or more of the UEs to add, as the respective signal adjustment; one or more of:

a phase shift;

a time delay;

a timing advance; or a transmission-beam change.

13. The method as recited in claim 9, further comprising:

receiving, from the base station, timing information that specifies when to add the signal adjustments; and directing one or more of the UEs in the UECS to add the respective signal adjustment to the respective uplink signal based on the timing information.

14. A method performed by a non-coordinating user equipment (UE) in a user equipment-coordination set (UECS) for mitigating signal degradation in joint transmissions, the method comprising:

transmitting a first uplink signal as part of a first joint transmission to a base station;

receiving, from a coordinating UE participating in the UECS, a command to add a signal adjustment in a second joint transmission to the base station, the command comprising a direction to add a random signal adjustment to a respective uplink signal of the non-coordinating UE; and transmitting a second uplink signal as part of a second joint transmission to the base station by adding the random signal adjustment to the second uplink signal.

15. The method as recited in claim 14, wherein the receiving the command to add the signal adjustment further comprises:

receiving an indication to add, as the signal adjustment, one or more of:

a phase shift;

a time delay;

a timing advance; or a transmission-beam change.

16. The method as recited in claim 14, further comprising:

selecting the signal adjustment from a set of adjustment options; or receiving the signal adjustment from the coordinating UE.

17. The method as recited in claim 14, wherein the transmitting the second uplink signal as part of the second joint transmission further comprises:

transmitting the second uplink signal as a retransmission of the first uplink signal.

18. The method as recited in claim 14, further comprising:

receiving, from the coordinating UE, timing information that specifies when to add the signal adjustment; and adding the signal adjustment to the second uplink signal based on the timing information.

19. An apparatus comprising:

a processor; and computer-readable storage media comprising instructions, responsive to execution by the processor, for directing the apparatus to:

analyze a first joint transmission from multiple user equipments (UEs) in a user equipment-coordination set (UECS);

determine the first joint transmission fails to meet a performance metric; and direct, via a command sent to a coordinating UE of the UECS, the multiple UEs participating in the UECS to add signal adjustments to a second joint transmission, the direction comprising the coordinating UE directing the multiple UEs in the UECS to add random signal adjustments to their respective uplink signals.

20. The apparatus of claim 19, wherein the instructions to direct the multiple UEs in the UECS to add the signal adjustments are executable by the processor to direct the apparatus to:

send the command to the coordinating UE of the UECS; and direct the coordinating UE to communicate the command to at least one non-coordinating UE using a respective side-link.

* * * * *